(12) United States Patent
Vendt et al.

(10) Patent No.: US 10,854,963 B2
(45) Date of Patent: *Dec. 1, 2020

(54) ANTENNA ASSEMBLY

(71) Applicant: FORD GLOBAL TECHNOLOGIES, LLC, Dearborn, MI (US)

(72) Inventors: Robert Vendt, Macomb, MI (US); Gregory James Grudzinski, Perrysburg, OH (US); George Anthony Bernwanger, Jr., Northville, MI (US); Leo James Lanctot, South Lyon, MI (US); David Richard Tengler, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/185,890

(22) Filed: Nov. 9, 2018

(65) Prior Publication Data

US 2019/0081392 A1    Mar. 14, 2019

Related U.S. Application Data

(63) Continuation-in-part of application No. 15/274,711, filed on Sep. 23, 2016, now Pat. No. 10,439,276.

(51) Int. Cl.
  *B32B 17/10* (2006.01)
  *H01Q 1/12* (2006.01)
  *H01Q 1/32* (2006.01)

(52) U.S. Cl.
  CPC ...... *H01Q 1/3275* (2013.01); *B32B 17/10064* (2013.01); *H01Q 1/1271* (2013.01); *H01Q 1/325* (2013.01)

(58) Field of Classification Search
  None
  See application file for complete search history.

(56) References Cited

U.S. PATENT DOCUMENTS

| | | | |
|---|---|---|---|
| 4,821,040 | A | 4/1989 | Johnson et al. |
| 5,534,879 | A | 7/1996 | Braun et al. |
| 8,427,381 | B2 | 4/2013 | Labrot et al. |
| 9,166,275 | B2 | 10/2015 | Altes et al. |
| 2006/0101737 | A1 | 5/2006 | Platz |
| 2010/0059253 | A1 | 3/2010 | Labrot et al. |

(Continued)

FOREIGN PATENT DOCUMENTS

| | | |
|---|---|---|
| DE | 102004011662 A1 | 10/2005 |
| DE | 102007012486 A1 | 9/2008 |
| JP | 10242726 A | 9/1998 |

(Continued)

OTHER PUBLICATIONS

Non-Final Office Action dated Nov. 14, 2018 for U.S. Appl. No. 15/274,711, filed Sep. 23, 2016.

(Continued)

*Primary Examiner* — Ricardo I Magallanes
(74) *Attorney, Agent, or Firm* — David Coppiellie; King & Schickli, PLLC

(57) ABSTRACT

An antenna assembly includes: (a) a ground plane having a plateau; (b) a glass panel including a metalized layer; and (c) an antenna including a base interfacing with the metalized layer and the plateau. The antenna assembly is characterized by a through glass panel connection to provide a more aesthetically pleasing appearance.

13 Claims, 5 Drawing Sheets

(56) References Cited

U.S. PATENT DOCUMENTS

2013/0140847 A1  6/2013  Altes et al.
2015/0236491 A1  8/2015  Bureloux et al.

FOREIGN PATENT DOCUMENTS

JP    2006246052 A    9/2006
KR    20090059979 A    6/2009
WO    2004086556 A1    10/2004

OTHER PUBLICATIONS

Final Office Action dated Mar. 28, 2019 for U.S. Appl. No. 15/274,711, filed Sep. 23, 2016.
English Machine Translation of DE102004011662A1 dated Oct. 13, 2005.
English Machine Translation of DE102007012486A1 dated Sep. 25, 2008.
English Machine Translation of JP2006246052A dated Sep. 14, 2006.
English Machine Translation of JP10242726A dated Sep. 11, 1998.
English Machine Translation of KR20090059979A dated Jun. 11, 2009.
English Machine Translation of WO2004086556A1 dated Oct. 7, 2004.
Non-Final Office Action dated Dec. 18, 2017 for U.S. Appl. No. 15/274,711, filed Sep. 23, 2016.
Final Office Action dated Jul. 24, 2018 for U.S. Appl. No. 15/274,711, filed Sep. 23, 2016.

ANTENNA ASSEMBLY

This application is a continuation-in-part (CIP) of U.S. patent application Ser. No. 15/274,711, filed on 23 Sep. 2016, the full disclosure of which is incorporated herein by reference.

TECHNICAL FIELD

This document relates generally to the motor vehicle equipment field and, more particularly, to a motor vehicle antenna characterized by a through glass panel attachment and assembly scheme.

BACKGROUND

A motor vehicle antenna must meet the reception requirements of AM/FM, GPS, satellite radio, cellular regional, cellular global and dedicated short range communication (DSRC—car to car), broadcast/communication technologies. Toward this end, current architecture and design has a small metal plate on a moon roof vehicle as part of the moon roof or a metal mini-roof as part of the body structure across the front or back of the moon roof. See FIG. 1 showing moon roof glass G with metal mini-roof supporting "shark fin" antenna A. Unfortunately, this places limits on the size of the glass panel to accommodate these alternatives. As a rule, body paint areas interrupt the roof glass and these in turn have to be masked and painted in order to make the roof look uniform.

This document relates to a new and improved antenna assembly that not only meets the reception requirements of AM/FM, GPS, satellite radio, cellular regional, cellular global and DSRC but also provides for improved aesthetics and the use of a larger, uninterrupted roof panel of glass or plastic.

SUMMARY

In accordance with the purposes and benefits described herein, an antenna assembly is provided. That antenna assembly comprises a ground plane including a plateau and a roof panel including a metalized layer, the roof panel overlying the ground plane around the plateau and an antenna including a base juxtaposed to the plateau. More specifically, the roof panel includes a mounting opening that extends around the plateau. The base interfaces with at least the plateau and the metalized layer, such as by at least one RF coupling standoff. By that interface, the ground plane and the metalized layer function together to significantly improve the reception of the antenna.

That roof panel may include a first layer of glass or plastic and a second layer of glass or plastic. The mounting opening may include a first aperture formed in the first layer and a second aperture formed in the second layer. The first aperture may have a first perimeter while the second aperture may have a second perimeter wherein the second perimeter is fully contained within the first perimeter. At least one RF coupling standoff or a connection lead may be provided between the base and the second layer within the first perimeter.

A first water seal may be provided between the base and the first layer. In addition, a second water seal may be provided between the base and the plateau. Still further a dust seal may be provided between the base and the first layer.

In at least one of the many possible embodiments, the first layer and the second glass may be tempered glass. An adhesive layer may be provided between the first layer and the second layer. In addition, the metalized layer may be provided between the first layer and the second layer.

In at least one of the many possible embodiments, an IR coating may be provided between the first layer and the second layer. Further, in at least one of the many possible embodiments instead of tempered glass, the second layer may be an alkali-aluminosilicate sheet glass.

In the following description, there are shown and described several preferred embodiments of the antenna assembly. As it should be realized, the antenna assembly is capable of other, different embodiments and its several details are capable of modification in various, obvious aspects all without departing from the antenna assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the antenna assembly and together with the description serves to explain certain principles thereof. In the drawing figures.

Reference will now be made in detail to the present preferred embodiments of the antenna assembly, an example of which is illustrated in the accompanying drawing figures.

DETAILED DESCRIPTION

Figure 1:
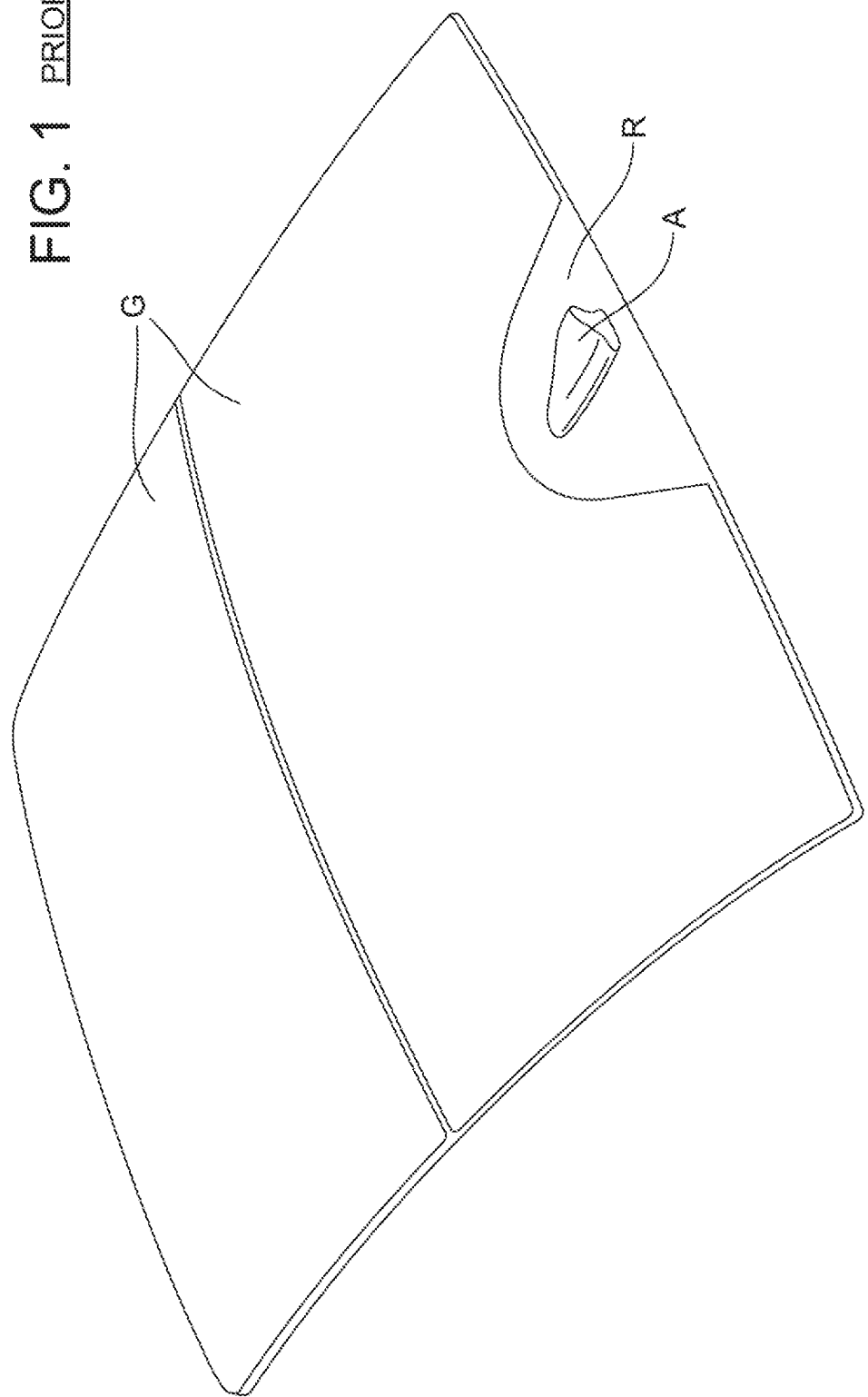
FIG. 1 is a perspective view of a prior art antenna assembly wherein the "shark fin" antenna is mounted on an antenna plate or metal mini-roof which interrupts the roof glass.
Figure 2:
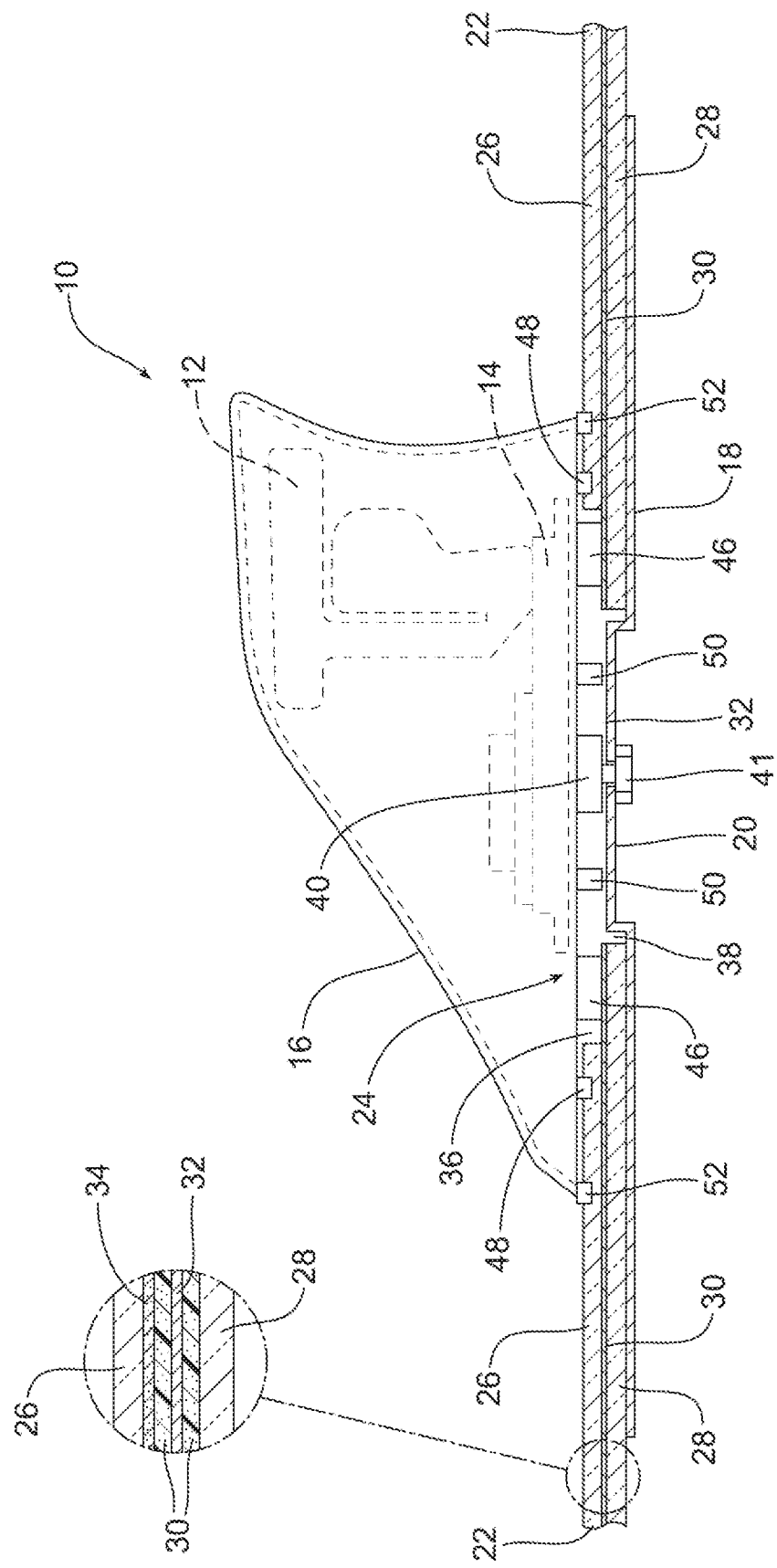
FIG. 2 is a schematic cross-sectional view illustrating the new and improved antenna assembly which is mounted through the roof glass.

Reference is now made to FIG. 2 illustrating the new and improved antenna assembly 10. The antenna assembly 10 includes an antenna 12 carried on a base 14 and housed within a shark fin shaped body 16. The skilled artisan will of course appreciate that any suitable configuration for the body 16 is possible and contemplated.

The antenna assembly 10 also includes a ground plane 18 having a raised area or plateau 20. The ground plane 18, including the plateau 20, is made from an appropriate metal to improve antenna reception. The ground plane 18 may be about 300 mm in diameter (minimum) directly underneath the antenna 12. In embodiments, the plateau 20 has a height of between about 1.0 and 4.0 mm.

A glass panel 22 overlies the ground plane 18. The skilled artisan will appreciate that the term "glass" is intended to encompass any suitable material currently used or later developed for fabricating glass panels for vehicles such as windows, windshields, glass sunroof/moon roof panels, glass roof panels, and others. Without intending any limitation, this may include tempered glass, glass laminates having first and second layers made of glass and an intervening plastic or polymer layer which reduces the likelihood of the glass shattering on receiving an impact, alkali-aluminosilicates (for example, Gorilla® glass), semi-tempered or heat strengthened glass, annealed glass, polycarbonate or other appropriate transparent, translucent or opaque plastics or polymers, and others.

The glass panel 22 includes an antenna mounting opening 24 that extends around the plateau 20. More specifically, the depicted glass panel 22 includes a first layer 26 and a second layer 28. An adhesive layer 30 of polyvinyl butyral (PVB) or other appropriate adhesive material is provided between the first layer 26 and the second layer 28. In addition, a metalized layer 32 (for example, a metal foil) may be provided in the adhesive layer 30 between the first layer 26 and the second layer 28. The metalized layer 32 functions in conjunction with the ground plane 18 to improve the reception of the antenna 12. Toward this end, the ground plane 18 and the metalized layer 32 may both be grounded to the motor vehicle body via an RF ground strap (not shown).

In some embodiments an IR coating 34 may also be provided between the first layer 26 and the second layer 28. In the illustrated embodiment, that IR coating 34 is provided on the bottom face of the first layer 26.

In many of the possible embodiments, the first layer 26 is formed from a tempered glass. The second layer 28 may be formed from a tempered glass as well. Where the first layer 26 and the second layer 28 are both formed from a tempered glass, the formulation of the tempered glass does not necessarily need to be identical and the thicknesses of the first layer 26 and the second layer 28 also do not need to be identical.

In other possible embodiments, the first layer 26 and the second layer 28 are fabricated of different materials. For example, in possible embodiments the second layer 28 is formed from an alkali-aluminosilicate sheet glass in order to provide additional strength to the glass panel 22. In one particularly useful embodiment, the first layer 26 is a tempered glass with a thickness of about 1.6 mm and the second, underlying layer 28 is an aluminosilicate sheet glass with a thickness of about 0.7 mm. Here it should be appreciated that this particular embodiment detailed above should be considered exemplary and not limiting in scope. In fact, the first layer 26 and the second layer 28 may be made from various glass or plastic materials as described above including, but not necessarily limited to tempered glass, semi-tempered or heat strengthened glass, annealed glass, polycarbonate or other appropriate transparent, translucent or opaque plastic, and others. In still yet other embodiments (see further description infra), the glass panel 22 may be a single layer formed of any of the materials described herein.

As further illustrated in FIG. 2, the mounting opening 24 provided in the glass panel 22 may comprise a first aperture 36 in the first layer 26 and a second aperture 38 in the second layer 28. That first aperture 36 may have a first perimeter while the second aperture 38 has a second perimeter wherein the second perimeter is fully contained within the first perimeter. The first aperture 36 and the second aperture 38 may be of any appropriate shape. In some embodiments, the first aperture 36 and second aperture 38 are cut by a series of overlapping drill holes in a process known as the Olympic circle concept.

When the antenna assembly 10 is fully assembled, the base 14 supporting the antenna 12 is connected via the antenna foot 46 and one or more bolts 41 juxtaposed to the plateau 20 of the ground plane 18. In one possible embodiment, the base 14 includes two threaded studs that extend through two cooperating apertures in the plateau 20 and one or more captured bolts secure the connection 40. Here it should be appreciated that the connection 40 is schematically illustrated in FIG. 2.

Figure 5:
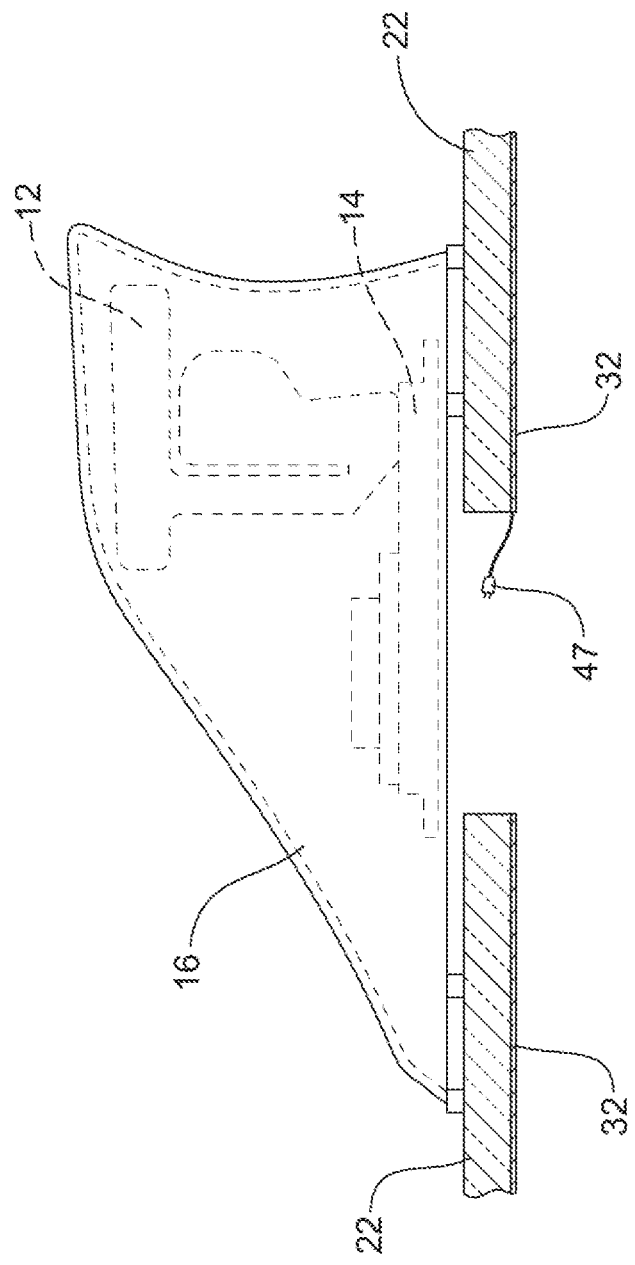
FIG. 5 is a schematic view highlighting an alternative embodiment including a connection lead instead of a RF coupling standoff.

As further illustrated in FIG. 2, at least one RF coupling standoff 46 is provided between the base 14 and the second layer 28 within the first perimeter of the first aperture 36. In the FIG. 2 embodiment, the RF coupling standoff 46 provides the interface between the base 14 and the metalized layer 32 to make the connection for best reception. In an alternative embodiment illustrated in FIG. 5, a connector lead 47 is provided to make the interface with the metalized layer 32 underlying the single layer glass panel 22 in place of the RF coupling standoff 46.

Returning to FIG. 2, a first water seal 48 is provided between the base 14 and the first layer 26. A second water seal 50 is provided between the base 14 and the plateau 20 of the ground plane 18. In addition, a dust seal 52 is provided between the base 14 and the first layer 26. Preferably, the first water seal 48, the second water seal 50 and the dust seal 52 are all continuous, uninterrupted bodies made from an appropriate seal material.

Figure 3:
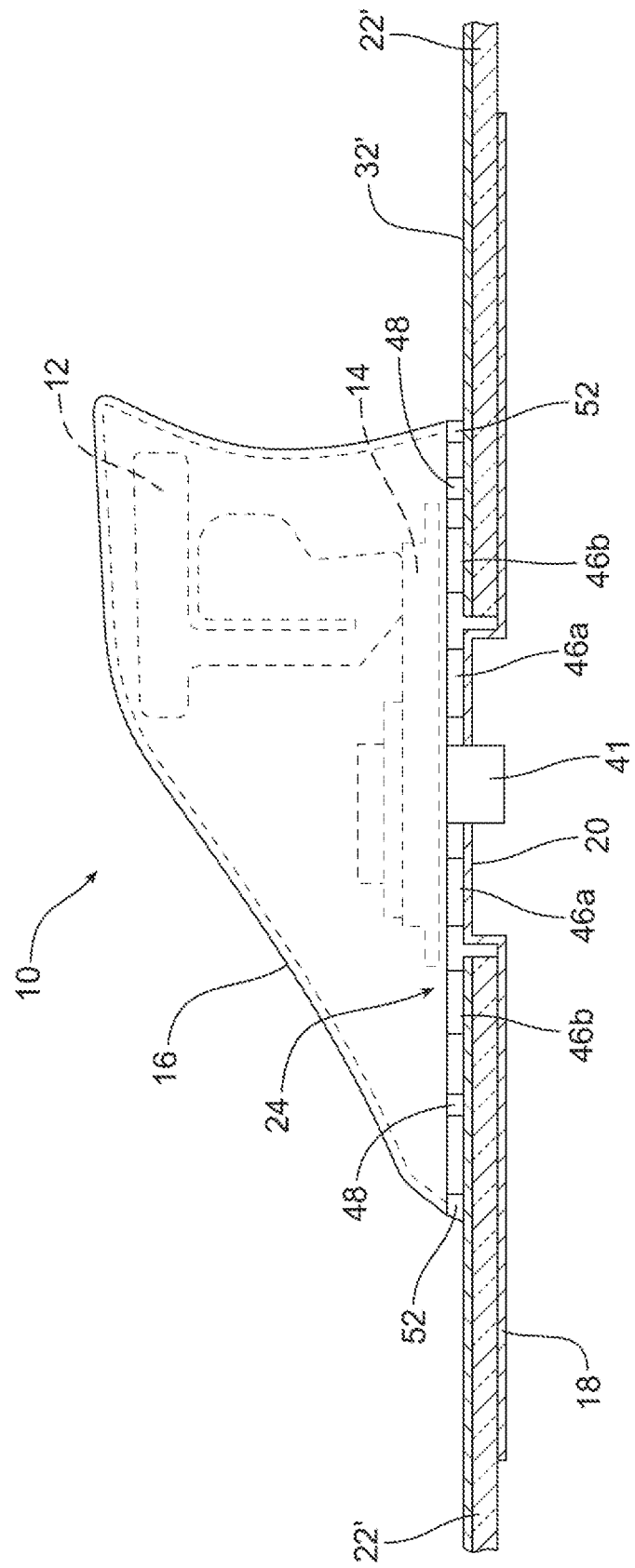
FIG. 3 is a schematic cross-sectional view illustrating an alternative embodiment of the antenna assembly of FIG. 2, mounted through the roof glass.

FIG. 3 illustrates an alternative embodiment of the assembly of FIG. 2. In this embodiment, a metalized layer 32' is provided on an outer surface of a glass panel 22'. The base 14 interfaces with the metalized layer 32' and the plateau 20 of the ground plane 18 to improve the reception of the antenna 12. Dust seals 52, water seals 48 and RF coupling standoffs 46 may be provided as described above. In the depicted embodiment, metal RF coupling standoffs 46a may be interposed between the base 14 and the plateau 20. Likewise, conductive sponge RF coupling standoffs 46b may be interposed between the base 14 and the metalized layer 32'.

Figure 4:
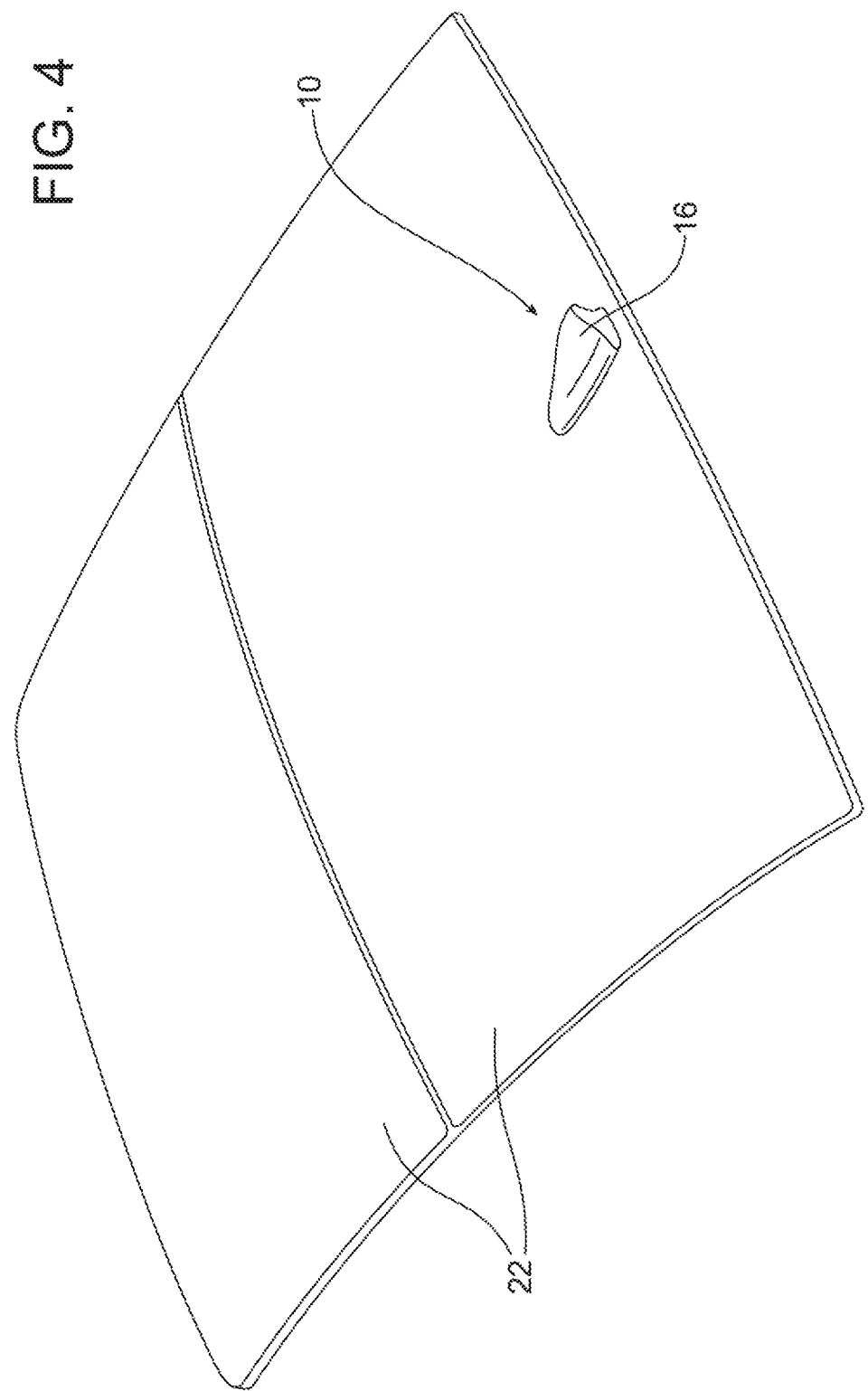
FIG. 4 is a perspective view of the new and improved antenna assembly illustrating how the shark fin antenna is mounted onto the roof glass thereby providing a more aesthetically pleasing appearance.

As illustrated in FIG. 4, in the embodiments of FIGS. 2 and 3 the antenna assembly 10 provides the appearance of an antenna 12 simply resting on an uninterrupted glass panel 22. The first layer 26 including, particularly, the inner face of the first layer 26 may be tinted or painted to conceal the underlying or intervening metalized layer 32 and ground plane 18 that are provided to enhance the reception of the antenna 12 (see FIG. 2). Alternatively, some or all of the glass panel 22' (FIG. 3) may be so tinted or painted. A headliner (not shown) may be provided under the ground plane 18 to conceal the ground plane 18 from view at the interior of the motor vehicle.

Thus, the glass panel incorporates what appears to be an uninterrupted, continuous face which is more aesthetically pleasing. By the described structures, the antenna assembly 10 may be mounted to any suitable glass panel, including without intending any limitation a glass roof panel, a glass window panel, a glass sunroof/moon roof panel, and others.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An antenna assembly, comprising:
a ground plane including a plateau;
a glass panel overlying said ground plane, said glass panel including a first layer overlying a second layer;
a mounting opening provided in said glass panel, said mounting opening including a first aperture in the first layer and a second aperture in the second layer wherein the first aperture has a first perimeter and the second aperture has a second perimeter fully contained within the first perimeter;
a metalized layer disposed between the first layer and the second layer and extending exposed within said first aperture on said second layer; and
an antenna having a base interfacing with the metalized layer and the plateau.

2. The antenna assembly of claim 1, wherein the base interfaces with the metalized layer and the plateau by one or more RF coupling standoffs.

3. The antenna assembly of claim 2, further including at least one water seal and at least one dust seal between the base and the first layer and at least one water seal between the base and the plateau.

4. The antenna assembly of claim 1, wherein the first layer and the second layer are fabricated of a tempered glass, a laminate, or an alkali-aluminosilicate sheet glass.

5. The antenna assembly of claim 1, including an adhesive layer between the first layer and the second layer.

6. The antenna assembly of claim 1, including an IR coating between the first layer and the second layer.

7. The antenna assembly of claim 1, further including at least one water seal and at least one dust seal between the base and the metalized layer.

8. An antenna assembly, comprising:
a ground plane including a plateau;
a glass panel overlying the ground plane and including a metalized layer and a mounting opening that is dimensioned whereby at least a glass panel-facing plateau surface does not contact the glass panel; and
an antenna having a base interfacing with the metalized layer and the plateau;
wherein the metalized layer is disposed between a first glass panel layer overlying a second glass panel layer;
further wherein the mounting opening includes a first aperture formed in the first layer and a second aperture formed in the second layer, the first aperture having a first perimeter and the second aperture having a second perimeter wherein the second perimeter is fully contained within the first perimeter.

9. The antenna assembly of claim 8, wherein the base interfaces with the metalized layer and the plateau by one or more RF coupling standoffs.

10. The antenna assembly of claim 8, further including at least one water seal and at least one dust seal between the base and the first glass panel layer and at least one water seal between the base and the plateau.

11. The antenna assembly of claim 8, wherein the first glass panel layer and the second glass panel layer are fabricated of a tempered glass, a laminate, or an alkali-aluminosilicate sheet glass.

12. The antenna assembly of claim 8, including an adhesive layer between the first glass panel layer and the second glass panel layer.

13. The antenna assembly of claim 8, including an IR coating between the first glass panel layer and the second glass panel layer.

* * * * *